(12) United States Patent
Yoshida et al.

(10) Patent No.: US 11,993,696 B2
(45) Date of Patent: May 28, 2024

(54) MODIFIED FIBROUS WOLLASTONITE AND METHOD OF PRODUCING THE SAME

(71) Applicant: NICHIA CORPORATION, Anan (JP)

(72) Inventors: Hideki Yoshida, Tokushima (JP);
Hirofumi Ooguri, Komatsushima (JP);
Yuji Akazawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 389 days.

(21) Appl. No.: 15/989,112

(22) Filed: May 24, 2018

(65) Prior Publication Data

US 2018/0340051 A1 Nov. 29, 2018

(30) Foreign Application Priority Data

May 26, 2017 (JP) .................. 2017-104814

(51) Int. Cl.
*C08K 3/34* (2006.01)
*C01B 33/24* (2006.01)
*C08K 7/10* (2006.01)

(52) U.S. Cl.
CPC .............. *C08K 3/34* (2013.01); *C01B 33/24* (2013.01); *C08K 7/10* (2013.01)

(58) Field of Classification Search
CPC .............. C01B 33/24; C08K 3/34; C08K 7/10
See application file for complete search history.

(56) References Cited

U.S. PATENT DOCUMENTS

| | | | | |
|---|---|---|---|---|
| 3,782,981 A | * | 1/1974 | Rostoker | C04B 33/34 501/122 |
| 3,843,380 A | * | 10/1974 | Beyn | C09C 1/3692 106/499 |
| 4,144,121 A | * | 3/1979 | Otouma | D21J 1/16 106/711 |

FOREIGN PATENT DOCUMENTS

| | | |
|---|---|---|
| CN | 102615684 A * | 8/2012 |
| JP | H09255322 A | 9/1997 |
| JP | 2002294070 A | 10/2002 |

OTHER PUBLICATIONS

"Effects of heat-treatment and nano-wollastonite impregnation on fire properties of solid wood," BioRes. 11(4), 8953-8967. (Year: 2016).*

Experimental determination of the solubility of natural wollastonite in pure water up to pressures of 5 GPa and at temperatures of 400-800 C. Geochimica et Cosmochimica Acta 70 (2006) 1796-1806 (Year: 2006).*

* cited by examiner

*Primary Examiner* — Shuangyi Abu Ali
(74) *Attorney, Agent, or Firm* — Hunton Andrews Kurth LLP

(57) ABSTRACT

A method of producing a modified fibrous wollastonite is provided. The method includes hydrothermally treating a fibrous wollastonite.

12 Claims, 1 Drawing Sheet

MODIFIED FIBROUS WOLLASTONITE AND METHOD OF PRODUCING THE SAME

CROSS-REFERENCE TO RELATED APPLICATIONS

This application claims priority to Japanese Patent Application No. 2017-104814, filed on May 26, 2017, the disclosure of which is hereby incorporated by reference in its entirety.

TECHNICAL FIELD

The present disclosure relates to a modified fibrous wollastonite and a method of producing the modified fibrous wollastonite.

DESCRIPTION OF THE RELATED ART

Wollastonite is a fibrous natural mineral mainly composed of $CaSiO_3$. As it is inexpensive, wollastonite is widely used, for example, as a resin reinforcing material. For example, Japanese Patent Application Publication No. 2002-294070 describes a resin composition containing wollastonite for use as a material for a reflector to be included in a light emitting device. However, wollastonite, which is a natural product, may contain impurity elements, such as iron (Fe), manganese (Mn), aluminum (Al), and carbon (C). These impurity elements can lower, for example, the dielectric properties of wollastonite. For example, Japanese Patent Application Publication No. Hei 9-255322 describes that heat-treatment of a wollastonite reduces its variation in dielectric properties.

SUMMARY

A modified fibrous wollastonite and a method of producing the modified fibrous wollastonite are provided. Surface analysis of the modified fibrous wollastonite by time-of-flight secondary ion mass spectrometry (TOF-SIMS) detects aluminum (Al), iron (Fe) and silicon (Si) where the detection intensity ratio of Fe to Si is less than 0.13, and Al to Si is greater than 0.03 to less than 1.08. The modified fibrous wollastonite is produced by a method including hydrothermally treating a fibrous wollastonite.

DETAILED DESCRIPTION

Figure 1:
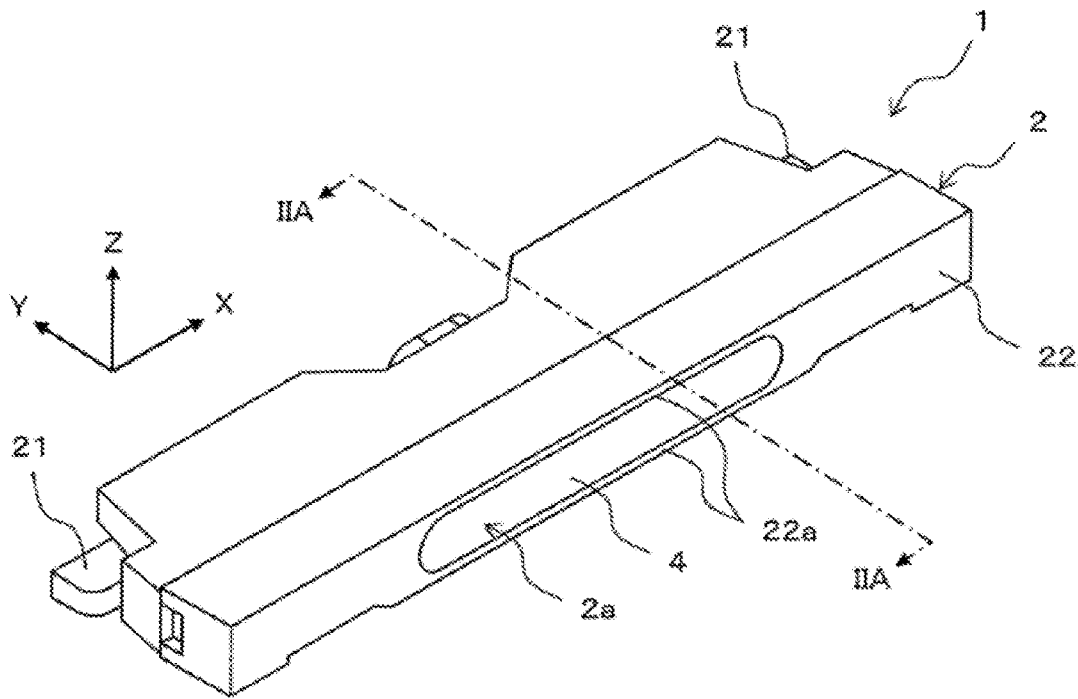
FIG. 1 is a perspective view of the structure of a light emitting device according to an embodiment of the present disclosure.

A resin composition containing a naturally occurring wollastonite may not provide a sufficient reflectance when, for example, the resin composition is used as a material for a reflector. One or more aspects of the present disclosure are directed to a modified fibrous wollastonite with improved reflectance, and a method of producing the modified fibrous wollastonite.

A first aspect of the present disclosure is a method of producing a modified fibrous wollastonite. The method includes hydrothermally treating a fibrous wollastonite.

A second aspect of the present disclosure is a fibrous wollastonite. Surface analysis of the fibrous wollastonite by TOF-SIMS detects aluminum (Al), iron (Fe), and silicon (Si) where the detection intensity ratio of Fe to Si is less than 0.13, and Al to Si is greater than 0.03 to less than 1.08.

A third aspect of the present disclosure is a resin composition containing the fibrous wollastonite and a resin.

As used herein, the term "step" means not only an independent step but also a step which cannot be clearly distinguished from the other steps but that can achieve the intended object. For the amount of each component contained in a composition, when a plurality of substances corresponding to the component are present in the composition, the amount of the component means the total amount of the corresponding substances present in the composition unless otherwise specified. The present disclosure will now be described in accordance with the embodiments. However, the embodiments described below are mere examples of the modified fibrous wollastonite and the method of producing the fibrous wollastonite for embodying the technical concept of the present disclosure, and the present disclosure is not limited to the modified fibrous wollastonite and the method of producing the fibrous wollastonite described below.

Method of Producing Modified Fibrous Wollastonite

The method of producing a modified fibrous wollastonite includes hydrothermally treating a fibrous wollastonite. Hydrothermally treating a naturally occurring fibrous wollastonite improves reflectance of the resulting fibrous wollastonite.

A naturally occurring fibrous wollastonite contains impurities, such as sodium (Na), potassium (K), iron (Fe), and aluminum (Al). Of these impurities, although Fe does not diffusively move to the surface by the hydrothermal treatment, for example, alkaline metals, such as Na and K, and Al seemingly diffusively move to the surface. The diffusively moved Al then seemingly forms a compound with Si (e.g., aluminum silicate) on the surface, while Fe is less likely to diffusively move to the surface and form an Fe compound having high light absorption properties. This seemingly results in improved reflectance.

The improvement rate of the reflectance of the modified fibrous wollastonite at 550 nm is, for example 1% or more, preferably 2% or more, more preferably 2.5% or more, and still more preferably 3% or more compared with the reflectance before the hydrothermal treatment. The upper limit of the improvement rate of the reflectance may be 20% or less. The improvement rate of the reflectance is determined as a percentage (%) of the value obtained by subtracting the reflectance before the modification from the reflectance after the modification, and dividing the obtained value by the reflectance before the modification.

The hydrothermal treatment is carried out by heating a fibrous wollastonite in the presence of water with pressure. For example, the hydrothermal treatment is carried out by heat-treating a mixture containing a fibrous wollastonite and water in a pressure-tight sealed container.

The fibrous wollastonite that undergoes the hydrothermal treatment may be any naturally occurring wollastonite mainly composed of $CaSiO_3$, and may have been refined. The total amount of the impurity elements, exclusive of Ca, Si, and O, is, for example, 3% by mass or less, and preferably 1% by mass or less. The fibrous wollastonite may be selected from commercial products available from, for example, Kinsei Matec Co., Ltd. The fibrous wollastonite may have an average fiber diameter of, for example, from 0.1 μm to 30 μm, preferably from 0.1 μm to 15 μm, and more preferably from 2 μm to 7 μm. The average fiber length is, for example, from 1 μm to 100 μm, preferably from 3 μm to 100 μm, and more preferably from 20 μm to 50 μM. The ratio of the fiber length to the fiber diameter, or the average aspect ratio, is for example 3 or more, preferably from 3 to 50, and more preferably from 5 to 30. The average fiber diameter and the average fiber length of a fibrous wollastonite can be obtained as an arithmetic mean value of 100000 particles determined by observing images taken with a scanning electron microscope (SEM). The average particle diameter measured as Fisher Sub Sieve Sizer's No. (F.S.S.S.N) is, for example, from 0.5 μm to 10 μm.

Water used for the hydrothermal treatment is preferably purified water, such as ion exchanged water, distilled water, reverse osmosis water, or ultrafiltration treated water.

The temperature of the hydrothermal treatment may be the boiling point or above of water, and, for example, 120° C. or more, preferably 140° C. or more, 150° C. or more, 160° C. or more, or 170° C. or more. Also, the temperature of the hydrothermal treatment may be, for example, 250° C. or less, and preferably 200° C. or less. Within this temperature range, the reflectance can further be improved.

The pressure to be applied in the hydrothermal treatment may be, for example, a water vapor pressure in a pressure container to be used for the hydrothermal treatment, and can be selected in accordance with the heating temperature. The pressure in the hydrothermal treatment may be, for example, 0.2 MPa or more, preferably 0.4 MPa or more, 0.6 MPa or more, or 0.8 MPa or more. Also, the pressure in the hydrothermal treatment may be, for example, 4 MPa or less, and preferably 1.6 MPa or less.

The duration of the hydrothermal treatment may be selected as appropriate in accordance with, for example, the heating temperature. The duration of the hydrothermal treatment may be, for example, 1 hour or more, preferably 10 hours or more, or 24 hours or more. Also, the duration of the hydrothermal treatment may be, for example, 100 hours or less, preferably 72 hours or less, or 48 hours or less. Within this duration range, the reflectance can be improved with further improved productivity.

The hydrothermal treatment may be carried out in the presence of atmospheric air, or in an inert gas atmosphere, such as nitrogen, as appropriate.

The mixture containing a fibrous wollastonite and water that undergoes the hydrothermal treatment may have a fibrous wollastonite content of, for example, 50% by mass or less, preferably 40% by mass or less, 30% by mass or less, or 25% by mass or less. Also, the mixture may have a fibrous wollastonite content of, for example, 5% by mass or more, and preferably 10% by mass or more. Within this range, the reflectance can be improved with further improved productivity.

The fibrous wollastonite that undergoes the hydrothermal treatment may have a BET specific surface area of, for example, from 1 m²/g to 5 m²/g. The BET specific surface area is determined, for example, by drying the fibrous wollastonite at 250° C., and then measuring by the dynamic constant-pressure method using nitrogen gas with an automatic specific surface area measuring device, such as Gemini by Shimadzu.

The hydrothermal treatment may cause, for example, the impurities, such as Al and K, contained in the fibrous wollastonite to move diffusively to the surface. This increases the total amount of, for example, Al and K on the surface compared with their amounts before the hydrothermal treatment. The hydrothermal treatment is preferably carried out under such conditions that allow the total amount of, for example, Al and K on the surface to be increased, for example, twice or more or five times or more compared with the total amount of Al and K before the hydrothermal treatment. Also, the hydrothermal treatment is preferably carried out under such conditions that allow the total amount of, for example, Al and K on the surface to be increased, for example, 30 times or less, preferably 20 times or less compared with their amounts before the hydrothermal treatment. The analysis of the impurity elements on the surface of the fibrous wollastonite can be carried out, for example, by later described TOF-SIMS.

The method of producing the modified fibrous wollastonite may include, for example, the step of collecting the fibrous wollastonite through solid-liquid separation after the hydrothermal treatment, and the step of drying at least a part of the adhered moisture as appropriate.

Fibrous Wollastonite

In the fibrous wollastonite according to the present embodiment, aluminum (Al), iron (Fe), and silicon (Si) are detected by surface analysis by TOF-SIMS, and the detection intensity ratio of Fe to Si is less than 0.13, and Al to Si is greater than 0.03 to less than 1.08. Such a fibrous wollastonite is obtained by modifying, or for example, hydrothermally treating a naturally occurring fibrous wollastonite. The respective detection intensity ratios of Al and Fe, which are contained in the fibrous wollastonite as impurities, to Si fall in a specific range. This results in an improved reflectance of the fibrous wollastonite to light of, for example, from 320 nm to 730 nm.

The detection intensity ratio of Fe to Si (Fe/Si) in the fibrous wollastonite is less than 0.13, and is preferably 0.1 or less, and more preferably 0.05 or less. The detection intensity ratio of Al to Si (Al/Si) is greater than 0.03 to less than 1.08, and is preferably 0.1 or more, and more preferably 0.5 or more, and is also preferably 1.05 or less, and more preferably 1 or less. With the detection intensity ratio of Fe to Si and the detection intensity ratio of Al to Si in the above ranges, the reflectance can be further improved.

The detection intensity ratio of Al to Fe (Al/Fe) in the fibrous wollastonite is, for example, 5 or more, preferably 10 or more, and more preferably 20 or more. The upper limit of the detection intensity ratio of Al to Fe is, for example, 50, and preferably 40. With the detection intensity ratio of Al to Fe in the above range, the reflectance can be further improved.

The fibrous wollastonite may contain alkaline metals, such as Na and K, as impurity elements. When the fibrous wollastonite contains alkaline metal, the detection intensity ratio of K to Si (K/Si) is, for example, 0.7 or more, preferably 1 or more, and more preferably 2 or more. The upper limit of the detection intensity ratio of K to Si is, for example, 40 or less, preferably 20 or less, and more preferably 10 or less. With the detection intensity ratio of K to Si in the above range, the reflectance can be further improved.

The surface analysis of the fibrous wollastonite is carried out by TOF-SIMS. TOF-SIMS is carried out, for example, using TOF.SIMS 5-200 (by ION-TOF) under the following conditions: primary ion source: $Bi^+$, primary accelerated voltage: 30 kv, measurement area: 200 μm square, and primary ion irradiation: $8.2 \times E10$ ions/cm².

A fibrous wollastonite can contain a trace amount of an iron compound as impurities. Through simple heat treatment, the iron compound seemingly changes its oxidation state to an iron compound (e.g., $\alpha\text{-}Fe_2O_3$) with high absorption of light of around 350 nm to 600 nm. However, through hydrothermal treatment, the iron compound is less likely to change to an iron compound (e.g., $\alpha\text{-}Fe_2O_3$) with high absorption of light of around 350 nm to 600 nm. The oxidation state, when represented by the ratio of oxygen atom (O) to Fe (0/Fe), of the iron compound as impurities after the hydrothermal treatment is for example greater than 0.5 to less than 1.5, preferably from 0.7 to 1.3. The ratio of oxygen atom (O) to Fe in the impurities is measured using a scanning electron microscope/energy dispersive X-ray analyzer (SEM-EDX). Of the particles observed other than the fibrous wollastonite particles, the ratio of 0/Fe is measured for 5 or more particles, excluding the particles containing 10% by mol or more of Si, or the particles not containing Fe. The average of the measured values is defined as the oxidation state of the iron compound as impurities. Specifically, the oxidation state is measured using an SEM-EDX (by Hitachi High-Technologies) under the condition of acceleration voltage of 5 kV.

The iron compound contained as impurities after the hydrothermal treatment includes at least an iron compound having magnetic properties. Examples of the iron compound having magnetic properties include, for example, iron and magnetite ($Fe_3O_4$).

The fibrous wollastonite according to the present embodiment is mainly composed of $CaSiO_3$, and contains, as impurities, at least Fe and Al each detected at a specific intensity on the surface. The modified wollastonite is fibrous having an average fiber diameter of, for example, from 0.1 µm to 30 µm, preferably from 0.1 µm to 15 µm, and more preferably from 2 µm to 7 µm. The average fiber length is, for example, from 1 µm to 100 µm, preferably from 3 µm to 100 µm, and more preferably from 20 µm to 50 µm. The average aspect ratio, or the ratio of fiber length to fiber diameter, is, for example, 3 or more, preferably from 3 to 50, and more preferably from 5 to 30.

Resin Composition

The resin composition contains a resin and the fibrous wollastonite in which Al, Fe, and Si are detected by surface analysis by TOF-SIMS, and the detection intensity ratio of Fe to Si is less than 0.13, and Al to Si is greater than 0.03 to less than 1.08. The resin composition has high mechanical strength and improved light reflectance, and thus can be used, for example, as a material for a reflector, and is suitable as a material for forming a package for a light-emitting device.

The resin contained in the resin composition may be either thermoplastic or thermosetting. Examples of the thermoplastic resin include liquid crystal polymers, aromatic polyamides, such as aliphatic polyamide and polyphthalamide, and polyester, such as polybutylene terephthalate. Examples of the thermosetting resin include epoxy resin and silicone resin.

The resin composition has a fibrous wollastonite content of, for example, 5% by mass or more, preferably 10% by mass or more, and more preferably 15% by mass or more, and also, for example, 70% by mass or less, preferably 40% by mass or less, and more preferably 20% by mass or less. The fibrous wollastonite has a high reflectance, and thus can be contained in a higher mass ratio than a naturally occurring fibrous wollastonite to further improve mechanical strength.

The resin composition may contain at least one of additives including an inorganic filler, such as titanium oxide, aluminum oxide, talc, silica, or zinc oxide; a flame retardant; a plasticizer; a diffusing agent; a dye; a pigment; a releasing agent; an ultraviolet absorber; an antioxidant; and a heat stabilizer as appropriate. In particular, at least one inorganic filler, such as titanium oxide or aluminum oxide, is preferably contained. The average particle diameter of the inorganic filler is, for example, from 0.08 µm to 10 µm, preferably from 0.1 µm to 5 µm as Fisher Sub Sieve Sizer's No. (FSSSN). When an inorganic filler is contained in the composition, the filler content of the composition is, for example, from 10% by mass to 60% by mass, and preferably from 20% by mass to 50% by mass.

Light-Emitting Device

The light-emitting device includes a package formed from the resin composition and including a bottom surface and walls forming a recess; a light-emitting element disposed on the bottom surface of the package; and a sealing member filled into the recess of the package to cover the light-emitting element. The package formed from the resin composition has an improved mechanical strength. Further, the recess of the package having an improved reflectance allows light from the light-emitting element to be efficiently taken out.

Figure 2:
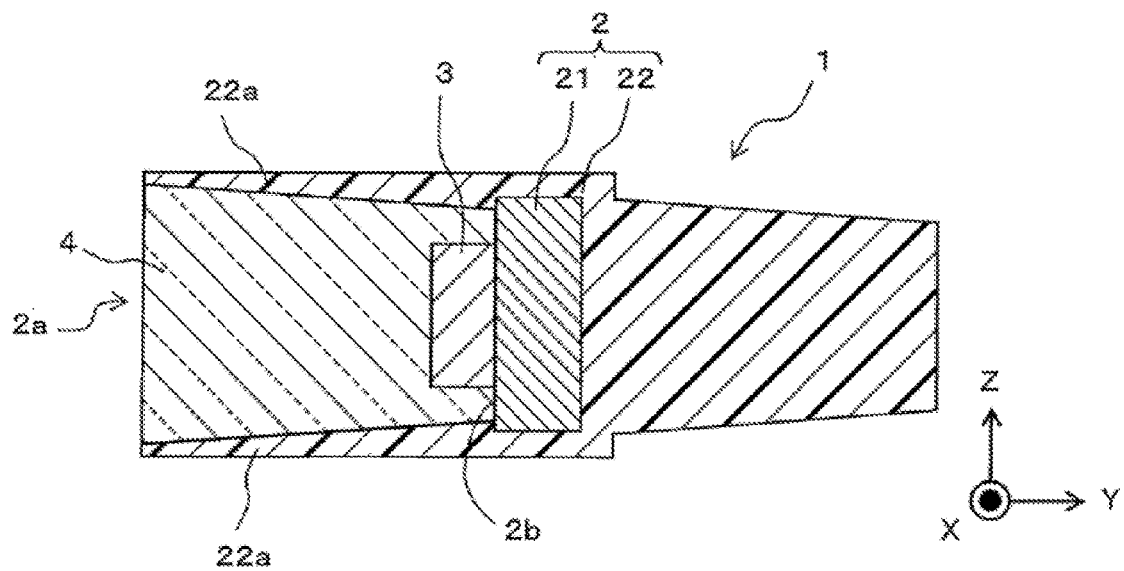
FIG. 2 is a cross-sectional view of the structure of the light emitting device according to the embodiment taken along the line IIA-IIA of FIG. 1.

The structure of the light-emitting device will now be described with reference to FIGS. 1 and 2. FIG. 1 is a perspective view of the structure of a light-emitting device according to an embodiment of the present disclosure. FIG. 2 is a cross-sectional view of the structure of the light emitting device according to the embodiment taken along the line IIA-IIA of FIG. 1. In FIGS. 1 and 2, the observation direction is shown using xyz axes of coordinates for ease of explanation. In the elongated, substantially rectangular parallelepiped light-emitting device 1, the longitudinal direction is the direction of x-axis, the transverse direction is the direction of y-axis, and the thickness direction is the direction of z-axis.

The light-emitting device 1 includes a package 2 having a recess 2a, a light-emitting element 3 disposed on the bottom surface 2b of the recess 2a of the package 2, and a translucent sealing member 4 provided in the recess 2a and sealing the light-emitting element 3. The package 2 also includes a pair of lead electrodes 21 and a resin molded body 22 holding the pair of lead electrodes 21. The light emitting device 1 has an elongated, substantially rectangular parallelepiped outer shape, with a small thickness or dimension in the z-axis direction. In the light emitting device 1, the end surface in the minus direction of the z-axis is the mounting surface. The recess 2a is provided in a manner to open on the end surface side in the minus direction of the y-axis. Thus, the light emitting device 1 is suitable for side view mounting in which light is emitted in a direction parallel to the mounting surface.

In the light-emitting device 1, the resin molded body 22 of the package 2 is formed from a resin composition including a resin and the fibrous wollastonite in which aluminum (Al), iron (Fe), and silicon (Si) are detected by surface analysis by TOF-SIMS, and the detection intensity ratio of Fe to Si is less than 0.13, and Al to Si is greater than 0.03 to less than 1.08.

The package 2 includes the pair of lead electrodes 21, and the resin molded body 22 holding the pair of lead electrodes 21 in a manner to separate the electrodes from each other. The package 2 has the recess 2a, which is open in a lateral direction with respect to the end surface in the minus direction of the z-axis, or the mounting surface. Thus, the bottom surface 2b of the recess 2a is substantially perpendicular to the mounting surface. The recess 2a is defined by the bottom surface 2b, which includes the pair of lead electrodes 21 and the resin molded body 22, and side walls 22a of the resin molded body 22. The side walls 22a has areas provided in the end surfaces in the z-axis direction, or the vertical direction of the recess 2a, and having a smaller thickness than the areas provided on the end surfaces in x-axis direction or the lateral direction.

The recess 2a contains a light-emitting element 3, and the side walls 22a are provided in a manner to surround the light-emitting element 3. The inner surfaces of the side walls 22a slope away from the bottom surface 2b side of the recess 2a toward its opening at a predetermined angle relative to the bottom surface 2b. This allows light emitted laterally from the light-emitting element 3 to be reflected from the side walls 22a toward the opening to be taken out from the package 2. The resin molded body 22, which is formed from the resin composition containing the fibrous wollastonite with an improved light reflectance, reflects light from the light-emitting element 3 to allow light to be efficiently taken out from the opening of the recess 2a.

Along with the increasing demand for a downsized light-emitting device, its package is increasingly made thinner. Specifically, the resin molded body 22 surrounding the light-emitting element 3 desirably partly has a thickness of, for example, 100 µm or less, or even 50 µm or less. The package 2 has the recess 2a with an oval opening, thus the outer dimension in the thickness direction of the package 2 can be downsized without changing the dimensions of the recess 2a by forming the side walls 22a to be thinner in the longitudinal direction of the recess 2a. Thus, the light-emitting device 1 can be produced thinner.

The thin side walls 22a, which are formed from the resin composition containing the fibrous wollastonite, have a sufficient mechanical strength and an improved reflectance. Although the recess 2 of the package 2 according to the present embodiment has an oval opening, the recess 2 may have, for example, a circular, an elliptical, a rectangular, or any other polygonal opening.

The light-emitting element 3 may include a substrate, such as sapphire, and a light-emitting layer formed on the substrate. For the light-emitting layer, a semiconductor, such as GaAlN, ZnS, ZnSe, SiC, GaP, GaAlAs, AlN, InN, AlIn-GaP, InGaN, GaN, or, AlInGaN, may be used. Of these, a nitride compound semiconductor element having a peak emission wavelength in the range of ultraviolet to visible light at short wavelengths (360 nm to 550 nm) may be used.

The sealing member 4 is provided in the recess 2a of the package 2 to seal, for example, the light-emitting element 3 disposed in the recess 2a, the lead electrodes 21, and a wire for electrically connecting the light-emitting element 3 and the lead electrodes 21. Although the sealing member 4 may not be provided, the sealing member 4 can protect the above members from deterioration due to moisture or gas, or damage due to mechanical contact. Although the material usable as the sealing member 4 are not particularly limited, the material is preferably translucent. Examples of the materials include resin materials, such as silicone resin and epoxy resin, and inorganic materials, such as glass.

The sealing member 4 may also contain a fluorescent substance for wavelength conversion of light from the light-emitting element 3, and a photo-reflective substance for scattering light from the light-emitting element 3. Examples of the photo-reflective substance may include particles of titanium oxide ($TiO_2$) and aluminum oxide ($Al_2O_3$). The fluorescent substance may be any that absorbs light from the light-emitting element 3, and converts the wavelength of the light to a different wavelength. For example, the fluorescent substance is preferably at least one selected from the group consisting of, for example, aluminum garnet-based fluorescent materials; nitride-based fluorescent materials, oxynitride-based fluorescent materials, and sialon-based fluorescent materials that are mainly activated by lanthanoid elements, such as Eu and Ce; alkaline earth halogen apatite fluorescent materials, alkaline earth metal borate halogen fluorescent materials, alkaline earth metal aluminate fluorescent materials, alkaline earth metal silicates, alkaline earth metal sulfides, alkaline earth metal thiogallates, alkaline earth metal silicon nitrides and germanates that are mainly activated by lanthanoid elements, such as Eu, and transition metal elements, such as Mn; rare earth aluminates and rare earth silicates that are mainly activated by lanthanoid elements such as Ce; and organic compounds and organic complex compounds that are mainly activated by lanthanoid elements, such as Eu.

EXAMPLES

The present invention will now be described in detail with reference to examples, but the present invention is not limited to these examples.

Example 1

10 g of a fibrous wollastonite (Wollastonite SH-1800 by Kinsei Matec, average fiber diameter: 3.5 µm average fiber length: 28 µm) and 70 ml of pure water were charged into a Teflon vessel (0.1 L), and sealed in a closed container. The whole container was hydrothermally treated at 170° C. for 60 hours, then solid-liquid separated, and dried at 105° C. to obtain a hydrothermally treated wollastonite.

Comparative Example 1

10 g of a fibrous wollastonite (SH-1800) was heat-treated in an alumina crucible at 800° C. for 2 hours to obtain a heat-treated wollastonite.

TOF-SIMS Evaluation

The hydrothermally treated wollastonite and the heat-treated wollastonite obtained above, and an untreated wollastonite (SH-1800) were subjected to surface analysis by TOF-SIMS (TOF.SIMS 5-200 by ION-TOF). The measurement conditions were as follows: primary ion source: $Bi^+$, primary acceleration voltage: 30 kv, measurement area: 200 µm square, and primary ion irradiation: $8.2 \times E\ 10$ ions/$cm^2$. The respective detection intensity ratios of Al to Si, Fe to Si, and K to Si were determined. The results are shown in Table 1.

Reflectance Evaluation

For each of the hydrothermally treated wollastonite, the heat-treated wollastonite, and the untreated wollastonite, the reflectances at 450 nm, at 550 nm, and at 650 nm were measured with a phosphor quantum efficiency spectrophotometer, QE-2000 (by Otsuka Electronics). The difference in reflectance between the hydrothermally treated wollastonite and the untreated wollastonite, and the difference in reflectance between the heat-treated wollastonite and the untreated wollastonite were each divided by the reflectance of the untreated wollastonite to obtain respective reflectance improvement rates (%). The results are shown in Table 1.

SEM-EDX Evaluation

For each of the hydrothermally treated wollastonite, the heat-treated wollastonite, and the untreated wollastonite, the oxidation state of Fe was evaluated under the measurement condition of acceleration voltage: 5 kV using an SEM-EDX (by Hitachi High-Technologies). Fe oxidation degree was obtained as the ratio of O to Fe (O/Fe). Of the particles observed other than the fibrous wollastonite particles, the ratio of oxygen atom (O) to Fe was measured for 5 or more particles excluding the particles containing 10% by mol or more of Si, or the particles not containing Fe, using an SEM-EDX, and an average value was calculated. The results are shown in Table 2.

Magnetism Evaluation

The hydrothermally treated wollastonite, the heat-treated wollastonite, and the untreated wollastonite were each put into pure water to obtain slurry. Into each slurry, Nd magnet was charged, and stirred for 30 min. The presence of attachment was visually inspected. The results are shown in Table 2.

TABLE 1

| Treatment | TOF-SIMS | | | Reflectance improvement rate (%) | | |
|---|---|---|---|---|---|---|
| | Al | Fe | K | 450 nm | 550 nm | 650 nm |
| Hydrothermal treatment | 0.30 | 0.01 | 4.24 | 2.5 | 3.4 | 3.7 |
| Heat treatment | 1.08 | 0.13 | 45.85 | −10.8 | −1.5 | 1.2 |
| No treatment | 0.03 | 0.02 | 0.67 | — | — | — |

Table 1 shows that the wollastonite through the hydrothermal treatment has an improved reflectance compared with the heat-treated product and the untreated product at every wavelength. Although the heated product shows an improved reflectance compared with the untreated product in the range of above 550 nm to 650 nm, the reflectance is lower in the range of from 450 nm to 550 nm. The surface analysis by TOF-SIMS of the hydrothermally treated wollastonite shows that the detection intensity ratio of Fe to Si is less than 0.13, and the detection intensity ratio of Al to Si is greater than 0.03 to less than 1.08. These results show that the wollastonite through the hydrothermal treatment allowed more Al contained inside the wollastonite to diffusively move to the surface of the wollastonite than the untreated product, and less Fe contained inside to diffusively move to the surface than the heated product. This seemingly results in improved reflectance of the hydrothermally treated wollastonite.

TABLE 2

| Treatment | Fe oxidation degree | Magnetism evaluation |
|---|---|---|
| Hydrothermal treatment | 1.0 | Black powder |
| Heat treatment | 1.7 | None |
| No treatment | 0.5 | Black powder |

Table 2 shows that the iron compound contained as impurities in the hydrothermally treated wollastonite has a lower Fe oxidation degree than the heated product, and has magnetic properties, and thus differs from the iron compound contained as impurities in the heated product.

Example 2-1

10 g of a fibrous wollastonite (SH-1800; a product from a different lot from Example 1) and 70 ml of pure water were charged into a Teflon vessel (0.1 L), and sealed in a closed container. The whole container was hydrothermally treated at 140° C. for 24 hours, solid-liquid separated, and dried at 105° C. to obtain a hydrothermally treated wollastonite. Table 3 shows the reflectance improvement rates. Concentrations shown in Table 3 each indicate the percent by mass (%) of the fibrous wollastonite in each hydrothermally treated product or each heat-treated product.

Examples 2-2 and 2-3

Hydrothermally treated wollastonites of Examples 2-2 and 2-3 were obtained in the same manner as in Example 2-1 except that the temperature of hydrothermal treatment was changed to 170° C. and 200° C., respectively. The reflectance improvement rates are shown in Table 3.

Comparative Examples 2-1 and 2-2

For each of Comparative Examples 2-1 and 2-2, 20 g of a fibrous wollastonite (SH-1800; a product from the same lot of Example 2-1) and 140 ml of pure water were charged into a beaker, and stirred at 15° C. or 70° C. for 24 hours, solid-liquid separated at 105° C., and dried to obtain a water-treated wollastonite. The reflectance improvement rates are shown in Table 3.

Examples 3-1 to 3-4

Hydrothermally treated wollastonites of Examples 3-1 to 3-4 were each obtained in the same manner as in Example 2-1 except that the temperature of the hydrothermal treatment was changed to 170° C., and the duration of the hydrothermal treatment was changed to 10 hours, 34 hours, 60 hours, and 70 hours, respectively. The reflectance improvement rates are shown in Table 3.

Example 4-1

Hydrothermally treated wollastonite of Example 4-1 was obtained in the same manner as in Example 3-3 except that 5 g of a fibrous wollastonite (SH-1800) and 75 ml of pure water were used, and that the concentration of fibrous wollastonite was changed to 6.3% by mass. The reflectance improvement rate is shown in Table 3.

Example 4-2

Hydrothermally treated wollastonite of Example 4-2 was obtained in the same manner as in Example 3-3 except that 20 g of a fibrous wollastonite (SH-1800) and 60 ml of pure water were used, and that the concentration of fibrous wollastonite was changed to 25.0% by mass. The reflectance improvement rate is shown in Table 3.

Example 4-3

Hydrothermally treated wollastonite of Example 4-3 was obtained in the same manner as in Example 3-3 except that 30 g of a fibrous wollastonite (SH-1800) and 50 ml of pure water were used, and that the concentration of fibrous wollastonite was changed to 37.5% by mass. The reflectance improvement rate is shown in Table 3.

TABLE 3

| | Hydrothermal treatment conditions | | | Reflectance improvement rate (%) | | |
|---|---|---|---|---|---|---|
| | Temperature (° C.) | Duration (hr) | Concentration (% by mass) | 450 nm | 550 nm | 650 nm |
| Example 2-1 | 140 | 24 | 12.5 | 2.4 | 2.8 | 3.0 |
| Example 2-2 | 170 | | | 3.2 | 4.0 | 4.2 |
| Example 2-3 | 200 | | | 3.1 | 3.5 | 4.2 |
| Comparative Example 2-1 | 15 | | | −0.1 | −0.2 | −0.2 |
| Comparative Example 2-2 | 70 | | | 0.1 | −0.2 | −0.3 |
| Example 3-1 | 170 | 10 | 12.5 | 2.9 | 3.3 | 3.2 |
| Example 2-2 | | 24 | | 3.2 | 4.0 | 4.2 |
| Example 3-2 | | 34 | | 3.4 | 4.1 | 4.2 |
| Example 3-3 | | 60 | | 3.2 | 4.0 | 4.2 |
| Example 3-4 | | 70 | | 3.1 | 3.9 | 4.1 |
| Example 4-1 | 170 | 60 | 6.3 | 2.2 | 3.3 | 3.4 |
| Example 3-3 | | | 12.5 | 3.2 | 4.0 | 4.2 |
| Example 4-2 | | | 25 | 2.5 | 3.6 | 3.6 |
| Example 4-3 | | | 37.5 | 2.1 | 2.8 | 2.7 |

Table 3 indicates that hydrothermally treating a fibrous wollastonite improves its reflectance.

Example 5

The hydrothermally treated wollastonite obtained in Example 1, titanium oxide (CR-90-2 by Ishihara Sangyo, average particle diameter: 0.45 µm), and polyamide resin (ARLEN C2000 by Mitsui Chemicals) were melt and kneaded to have a mass ratio of 15:40:45 at a temperature of 320° C., which is equal to or higher than the melting point of polyamide resin, and molded by extrusion to prepare Resin Composition Pellet 1.

Comparative Example 3

Resin Composition Pellet C1 was prepared in the same manner as in Example 5 except that an untreated fibrous wollastonite (SH-1800) was used.
Evaluation of Resin Compositions
From each of Resin Composition Pellets 1 and C1, a molded body having a thickness of 4 mm was prepared. For each of the molded body, reflectance at 560 nm was measured using QE-2000 by Otsuka Electronics.
Comparison of the reflectances revealed that the molded body prepared from Resin Composition Pellet 1 has a 1.2% higher reflectance than the molded body prepared from Resin Composition Pellet C1.
Light-Emitting Device
Packages were prepared by injection-molding Resin Composition Pellets 1 and C1, and light-emitting devices like the one shown in FIG. 1 were produced using the same light-emitting element, the same sealing resin, and the same fluorescent substance. The total luminous flux of light emitted from each light-emitting device with the light-emitting element being activated was evaluated with a total luminous flux measuring machine including an integrating sphere. Comparison of the luminous fluxes revealed that the light-emitting device produced from Resin Composition Pellet 1 has 0.7% higher luminous flux than the light-emitting device produced from Resin Composition Pellet C1.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method consisting of: heating a composition consisting of a fibrous wollastonite having an average fiber length of from 1 μm to 100 μm and water at a pressure of 0.2 MPa or more and 4 MPa or less.

2. The method according to claim 1, wherein the heating is carried out at a temperature of above 100° C. to 250° C.

3. The method according to claim 1, wherein the heating is carried out in a time period of from 1 hour to 100 hours.

4. The method according to claim 1, wherein the composition consisting of the fibrous wollastonite and water has a fibrous wollastonite content of 40% by mass or less relative to a total mass of the composition.

5. The method according to claim 2, wherein the heating is carried out in a time period of from 1 hour to 100 hours.

6. The method according to claim 2, wherein the composition consisting of the fibrous wollastonite and water has a fibrous wollastonite content of 40% by mass or less relative to a total mass of the composition.

7. The method according to claim 3, wherein the composition consisting of the fibrous wollastonite and water has a fibrous wollastonite content of 40% by mass or less relative to a total mass of the composition.

8. The method according to claim 5, wherein the composition consisting of the fibrous wollastonite and water has a fibrous wollastonite content of 40% by mass or less relative to a total mass of the composition.

9. The method according to claim 1, wherein the heating is carried out at a pressure of 0.8 MPa or more and 4 MPa or less.

10. The method according to claim 1, wherein the method consists of heating a composition consisting of a fibrous wollastonite and water at a pressure of 0.2 MPa or more and 4 MPa or less in a closed container.

11. The method according to claim 1, wherein the method consists of heating a composition consisting of a fibrous wollastonite and water at a pressure of 0.2 MPa or more and 4 MPa or less in a sealed container.

12. The method of claim 1, wherein a product obtained by the method has an average fiber length of fibrous wollastonite that is from 1 μm to 100 μm.

* * * * *